United States Patent
Lee et al.

(10) Patent No.: US 8,924,018 B2
(45) Date of Patent: Dec. 30, 2014

(54) BRIDGE INSPECTION ROBOT CAPABLE OF CLIMBING OBSTACLE

(75) Inventors: Byeong-Ju Lee, Suwon Gyeonggi-Do (KR); Jae-In Shin, Cheongju Chungcheongbuk-Do (KR); Chang-Ho Park, Yongin Gyeonggi-Do (KR); Young-Ho Park, Seongnam Gyeonggi-Do (KR); Moon-Seok Nam, Yongin Gyeonggi-Do (KR)

(73) Assignee: Expressway & Transportation Research Institute, Korea Expressway Corporation, Hwaseong, Gyeonggi-Do (KR)

( * ) Notice: Subject to any disclaimer, the term of this patent is extended or adjusted under 35 U.S.C. 154(b) by 907 days.

(21) Appl. No.: 12/989,605

(22) PCT Filed: Apr. 20, 2009

(86) PCT No.: PCT/KR2009/002038
§ 371 (c)(1),
(2), (4) Date: Jan. 7, 2011

(87) PCT Pub. No.: WO2009/131341
PCT Pub. Date: Oct. 29, 2009

(65) Prior Publication Data
US 2011/0106313 A1    May 5, 2011

(30) Foreign Application Priority Data
Apr. 23, 2008 (KR) .................. 10-2008-0037493

(51) Int. Cl.
| B25J 19/04 | (2006.01) |
| B25J 5/00 | (2006.01) |
| G02B 27/64 | (2006.01) |
| B25J 19/02 | (2006.01) |
| E01D 19/10 | (2006.01) |

(52) U.S. Cl.
CPC .............. *B25J 5/007* (2013.01); *G02B 27/648* (2013.01); *G03B 2205/00* (2013.01); *G03B 2205/0007* (2013.01); *B25J 19/021* (2013.01); *E01D 19/106* (2013.01)

USPC ......................................... 700/259

(58) Field of Classification Search
CPC ............. E01D 19/106; G03B 2205/00; G03B 2205/0007; G02B 27/64; G02B 27/648
USPC ........................................... 700/259; 180/8.2
See application file for complete search history.

(56) References Cited

U.S. PATENT DOCUMENTS

| 4,977,971 A * | 12/1990 | Crane et al. ..................... 180/8.3 |
| 8,073,317 B2 * | 12/2011 | Kitano ............................. 396/55 |
| 2004/0164505 A1 | 8/2004 | Clemens et al. |
| 2008/0054158 A1 * | 3/2008 | Ariyur et al. ................ 250/203.1 |
| 2010/0049367 A1 * | 2/2010 | Yang .............................. 700/259 |

FOREIGN PATENT DOCUMENTS

KR    20070079798    *    8/2007    ............... B25J 13/08

* cited by examiner

*Primary Examiner* — Jerrah Edwards
(74) *Attorney, Agent, or Firm* — Edwards Wildman Palmer LLP; Kongsik Kim

(57) ABSTRACT

Provided is a bridge inspection robot that avoids obstacles is provided. An ascending/descending portion corresponds to a gap distance between a first and second girder flange provided at the upper side of a bridge pier. An obstacle detection portion detects the obstacle and a photographing altitude control portion detects an altitude change of an image photographing portion according to obstacle height when the robot main body climbs up/down or avoids the obstacle, and adjusts a photographing height to correspond to the altitude change. A position calculation portion measures a mobile position of the robot main body corresponding to a consecutively photographed image, to calculate axis coordinates. An image processing portion receives the consecutively photographed images and coordinates, to confirm the crack elements corresponding to images and produce an image of an actual position coordinate of the corresponding image.

5 Claims, 13 Drawing Sheets

(Climbing up) (Climbing down)

US 8,924,018 B2

BRIDGE INSPECTION ROBOT CAPABLE OF CLIMBING OBSTACLE

This application is the U.S. national phase, pursuant to 35 U.S.C. §371, of PCT international application Ser. No. PCT/KR2009/002038, filed Apr. 20, 2009, designating the United States and published in English on Oct. 29, 2009 as publication WO 2009/131341 A2, which claims priority to Korean application Ser. No. 10-2008-0037493, filed Apr. 23, 2008. The entire contents of the aforementioned patent applications are incorporated herein by this reference.

TECHNICAL FIELD

The present invention relates to a robot for inspecting a bridge, and more particularly to, a bridge inspection robot which is capable of avoiding an obstacle so as to successively photograph the bottom surface of a bridge in which the bridge inspection robot climbs up/down or avoids an obstacle such as a vertical stiffener which is provided vertically with a pre-stressed concrete (PSC) box splice connection portion or a flange, when the bridge inspection robot moves along a bridge inspection path for a PSC box bridge or a stability of bridge girders (SBG) bridge, for example, on a flange between a girder and another girder.

BACKGROUND ART

Generally, a PSC box bridge or a SBG bridge is a representative type of a long and large bridge whose span is long. In the case of inspecting whether or not there are cracks or corrosions on a lower surface of a bridge between a girder and another girder, a workbench or a moving path such as a scaffold is installed between a girder and another girder on the lower portion of a bridge, and then a worker observes and investigates visually whether or not there are cracks and corrosions on the lower surface of the bridge, using the workbench or the moving path.

However, the costs of visually inspecting cracks or corrosions of a bridge are expensive as described above, since a workbench or a moving path such as a scaffold should be installed. Moreover, when much wind blows, the workbench or the moving path sways, and thus there is a disadvantage safety of a worker or workers cannot be ensured.

In addition, when a bridge inspection work is visually performed, only a worker can see data of corrosions or cracks of a bridge. Accordingly, an inspection work is not reliable, and the data cannot be stored. As a result, there is a problem that a review or analysis of the inspection data becomes difficult later.

Therefore, in order to solve the above-described problem, there has been proposed that a mobile robot provided with a camera whose position control is possible passes a bridge inspection path of the lower portion of a bridge, photographs the lower portion of the bridge, processes the photographed images, and carries out appearance investigation of the bridge.

However, when the above-described mobile robot is used to move on a flange between a girder and another girder of a PSC box bridge in order to inspect the lower surface of the bridge, or to inspect the inner portion of the box of a SBG bridge, there has occurred a problem that the mobile robot cannot continuously move because of obstacles such as partitions, bridge joint members or vertical stiffeners which are provided in a box. Accordingly, when the mobile robot avoids the obstacles and moves, there has occurred a problem that a position of the bottom surface of the bridge is changed, and the bottom surface of the bridge cannot be successively photographed.

In addition, since images photographed according to position changes of the mobile robot have respectively different position information (for example, coordinates that correspond to in an altitude or distance from a camera), there are problems that a lot of errors occur in processing continuous images in correspondence to a photographing position, and accordingly reliability regarding an image analysis is lowered in the case that a defect analysis regarding a bridge is carried out.

DISCLOSURE OF INVENTION

Technical Problem

To solve the above problems, it is an object of the present invention to provide a bridge inspection robot which is capable of avoiding an obstacle in which a photographing height of a camera is positioned at a regular altitude or distance with respect to the bottom surface of a bridge, so that images photographed by the camera according to position changes of the robot have respectively identical position information, when the bridge inspection robot climbs up/down or avoids an obstacle which exists in at least one of flanges during moving along a bridge inspection path, for example, on the flanges between a girder and another girder.

It is another object of the present invention to provide a bridge inspection robot which is capable of avoiding an obstacle in which consecutive images photographed by a camera are arranged so as to have an identical altitude value, to thus successively grasp actual crack elements of the images and thereby accurately calculate actual position information for the actual crack elements of the images.

It is still another object of the present invention to provide a bridge inspection robot which is capable of avoiding an obstacle so as to successively photograph the bottom surface of a bridge in which the bridge inspection robot climbs up/down or avoids an obstacle such as a vertical stiffener which is provided vertically at the upper side of at least one flanges, when the bridge inspection robot moves along a bridge inspection path, for example, on the flanges, without having position changes of the robot or changes of the bottom surface of a bridge which is photographed by a camera.

Technical Solution

To accomplish the above objects of the present invention, according to an aspect of the present invention, there is provided a bridge inspection robot which is capable of avoiding an obstacle, the bridge inspection robot comprising:

an ascending/descending portion (110) which is extended to correspond to a gap distance between a flange (11a) of a first girder (11) and a flange (12a) of a second girder (12) which are provided at the upper side of a pier (L) of a bridge (10) in which a robot main body (101) climbs up/down or avoids an obstacle, when the robot main body (101) moves on the flanges, for example, along a bridge inspection path;

an obstacle detection portion (120) which detects the obstacle which exists on the flanges;

a photographing altitude control portion (150) which detects an altitude change of an image photographing portion (130) according to height of the obstacle when the robot main body (101) climbs up/down or avoids the obstacle, and adjusts a photographing height of the image photographing portion (130) so as to correspond to the altitude change, to thus make the image photographing portion (130) have a z-axis coordinate of an identical height all the time;

a position calculation portion (160) which measures a mobile position of the robot main body (101) which corresponds to a consecutive image photographed by the image photographing portion (130), to thus calculate x/y-axis coordinates of the image photographing portion (130); and an image processing portion (170) which receives the consecutively photographed images and x/y/z-axis coordinates corresponding to the consecutively photographed images, to thus continuously confirm actual crack elements corresponding to the images and to thus produce recognizable images of actual position coordinates of the corresponding images.

Preferably but not necessarily, the ascending/descending portion (110) comprises:

a plurality of up/down links (111) which are provided at the lower side of the robot main body (101) and performs up/down operations;

rotational blocks (112) which are rotatably connected to the up/down links (111);

a pair of extension and contraction booms (113) which are provided at both sides of the rotational blocks (112), respectively, and which are extended up to the flanges (11a, 12a) of the first girder (11) and the second girder (12) between the first girder (11) and the second girder (12), so that the robot main body (101) are stably positioned between the first girder (11) and the second girder (12); and moving wheels (114) which are rotated by driving forces of driving shafts (not shown) which are provided at the pair of the extension and contraction booms (113), respectively, to thereby make the robot main body (101) move along the flanges (11a, 12a).

In addition, preferably but not necessarily, the ascending/descending portion (110) makes the moving wheels (114) climb up/down an obstacle which connects between the girders or joint members which are provided at the upper portions of the flanges, through up/down or seesaw rotations of the up/down links (111) and the rotational blocks (112), and makes the moving wheels (114) avoid and climb over the obstacle which connects between the girders or vertical stiffeners which are vertical to the flanges, through extension and contraction of the pair of the extension and contraction booms (113), without having position changes of the robot main body (101).

Advantageous Effects

Therefore, the present invention provides a bridge inspection robot which climbs up/down an obstacle which exists in a bridge inspection path, and which adjusts a photographing angle of a camera so as to correspond to a slope of the robot through a slope detection sensor and a camera angle adjustment portion, when the robot avoids the obstacle, to thereby maintain the photographing angle to be perpendicular between the camera and the lower surface of the bridge all the time although the slope of the robot is changed.

In addition, a body tube of the camera is escalated so as to correspond to a photographing height change of the camera, through an altitude detection sensor and a camera height adjustment portion when the robot climbs up/down an obstacle, to thereby maintain an identical photographing height all the time although a photographing height of the camera is changed with respect to the lower surface of the bridge when the robot avoids the obstacle.

In addition, the bridge inspection robot avoids an obstacle such as a vertical stiffener which is provided vertical with the upper side of the flanges, respectively, when the robot moves along a bridge inspection path, for example, the flanges, without having caused position changes of the robot, to thereby enable the camera to continuously photograph the lower surface of the bridge.

BEST MODE FOR CARRYING OUT THE INVENTION

The above and/or other objects and/or advantages of the present invention will become more apparent by the following description.

Hereinbelow, a bridge inspection robot according to a preferred embodiment of the present invention will be described with reference to the accompanying drawings in detail.

Figure 1:
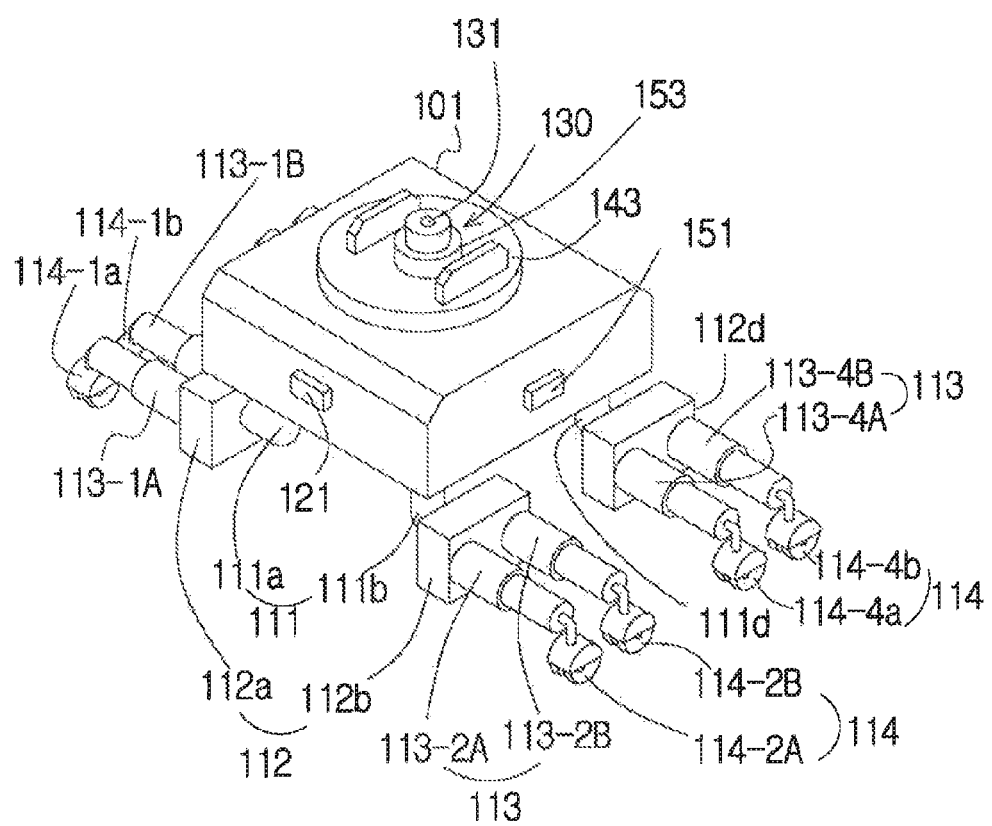
FIG. 1 is a perspective view showing a robot for inspecting a bridge which is capable of avoiding an obstacle according to a preferred embodiment of the present invention.
Figure 2:
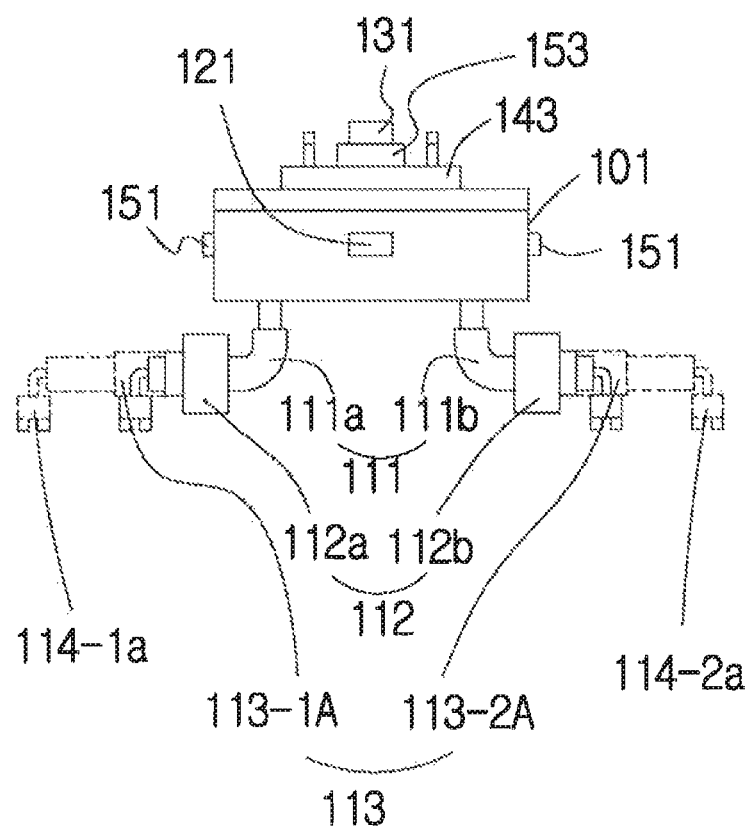
FIGS. 2 to 4 are a front view, a plan view and a side view showing the bridge inspection robot of FIG. 1, respectively.
Figure 3:
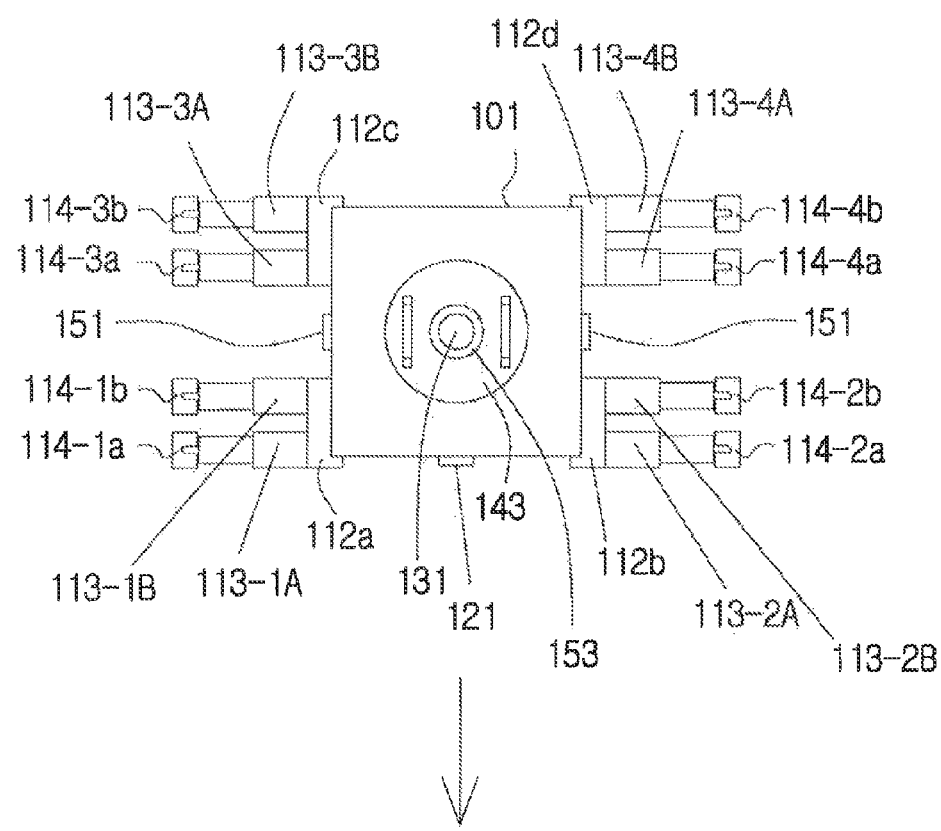
Figure 4:
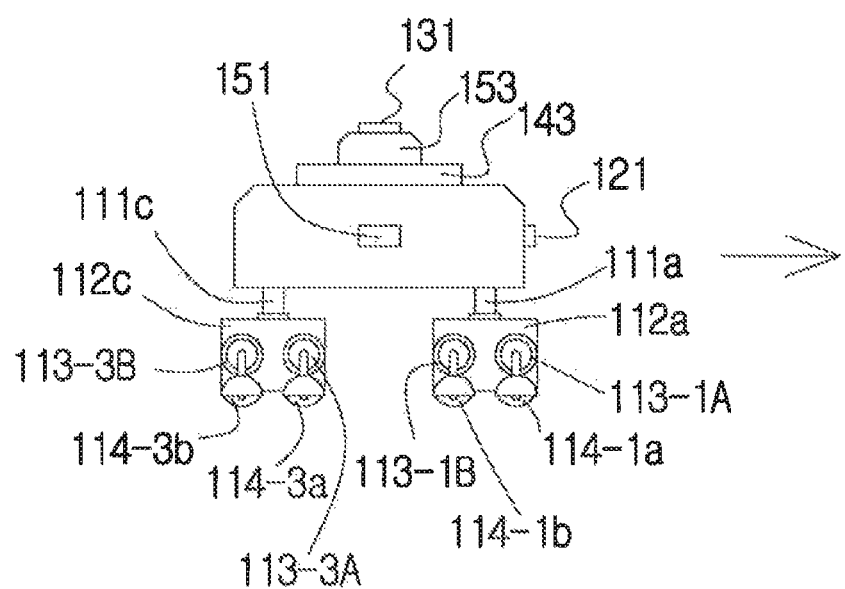
Figure 5:
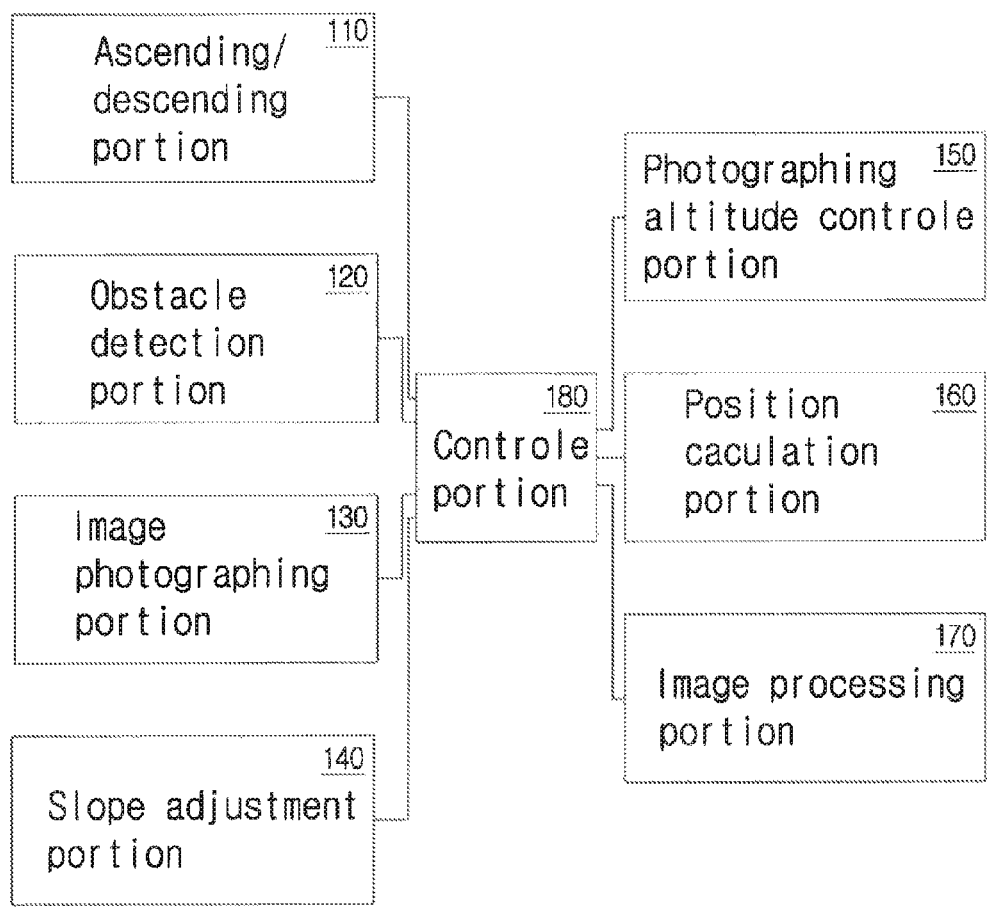
FIG. 5 block diagram schematically showing the bridge inspection robot of FIG. 1.
Figure 6:
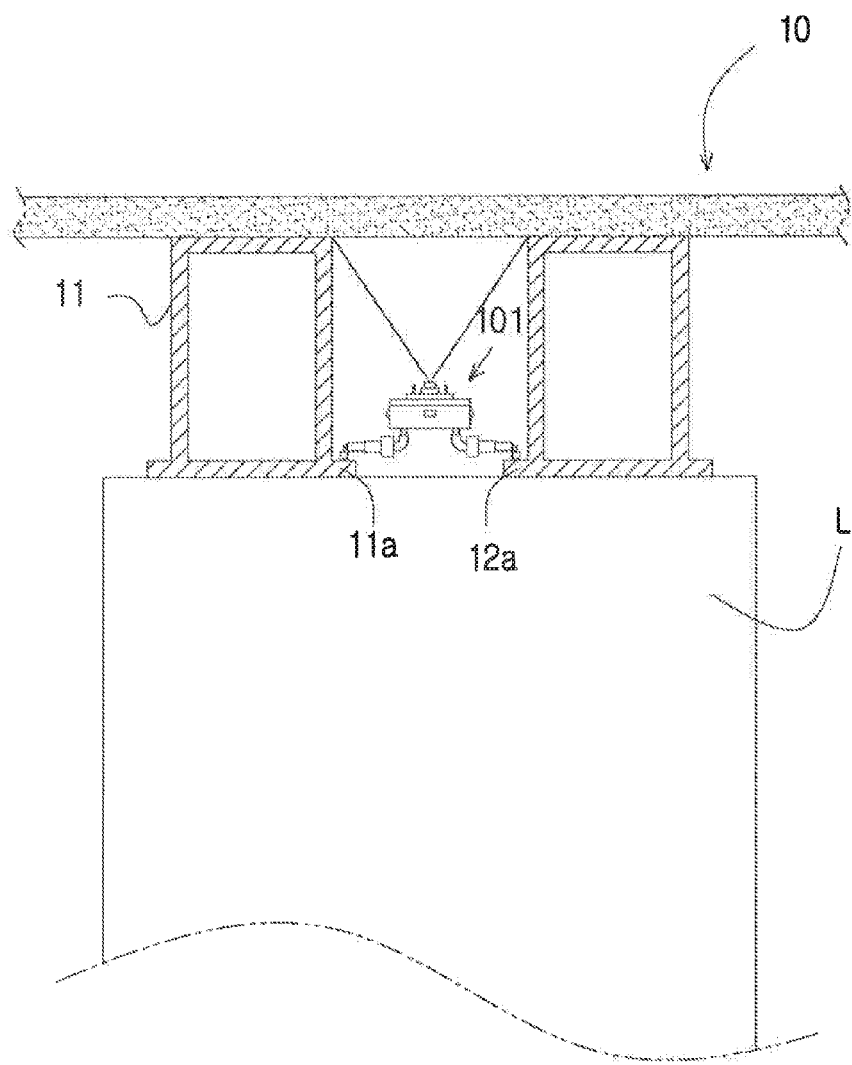
FIGS. 6 and 7 show a use state of the bridge inspection robot of FIG. 1, respectively.
Figure 7:
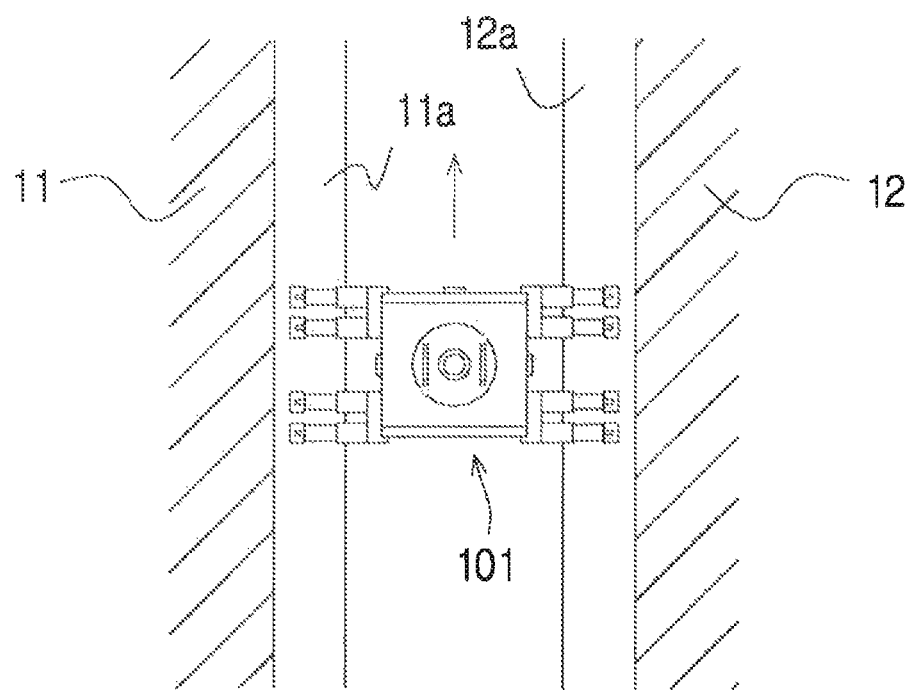

FIG. 1 is a perspective view showing a robot for inspecting a bridge which is capable of avoiding an obstacle according to a preferred embodiment of the present invention. FIGS. 2 to 4 are a front view, a plan view and a side view showing the bridge inspection robot of FIG. 1, respectively. FIG. 5 block diagram schematically showing the bridge inspection robot of FIG. 1. FIGS. 6 and 7 show a use state of the bridge inspection robot of FIG. 1, respectively.

As shown in FIGS. 1 through 7, a bridge inspection robot which is capable of avoiding an obstacle, according to a preferred embodiment of the present invention, includes: an ascending/descending portion 110 which is extended to correspond to a gap distance between a flange 11a of a first girder 11 and a flange 12a of a second girder 12 which are provided at the upper side of a pier L of a bridge 10 in which a robot main body 101 climbs up/down or avoids an obstacle, when the robot main body 101 moves on the flanges, for example, along a bridge inspection path; an obstacle detection portion 120 which detects the obstacle which exists on the flanges; a photographing altitude control portion 150 which detects an altitude change of an image photographing portion 130 according to height of the obstacle when the robot main body 101 climbs up/down or avoids the obstacle, and adjusts a photographing height of the image photographing portion 130 so as to correspond to the altitude change, to thus make the image photographing portion 130 have a z-axis coordinate of an identical height all the time; a position calculation portion 160 which measures a mobile position of the robot main body 101 which corresponds to a consecutive image photographed by the image photographing portion 130, to thus calculate x/y-axis coordinates of the image photographing portion 130; an image processing portion 170 which receives the consecutively photographed images and x/y/z-axis coordinates of the image photographing portion 130 corresponding to the consecutively photographed images, to thus continuously confirms the actual crack elements corresponding to the images and to thus produce a recognizable image of an actual position coordinate of the corresponding image; and a controller 180 which controls the ascending/descending portion 110, the obstacle detection portion 120, the photographing altitude control portion 150, the position calculation portion 160, and the image processing portion 170.

Figure 8:
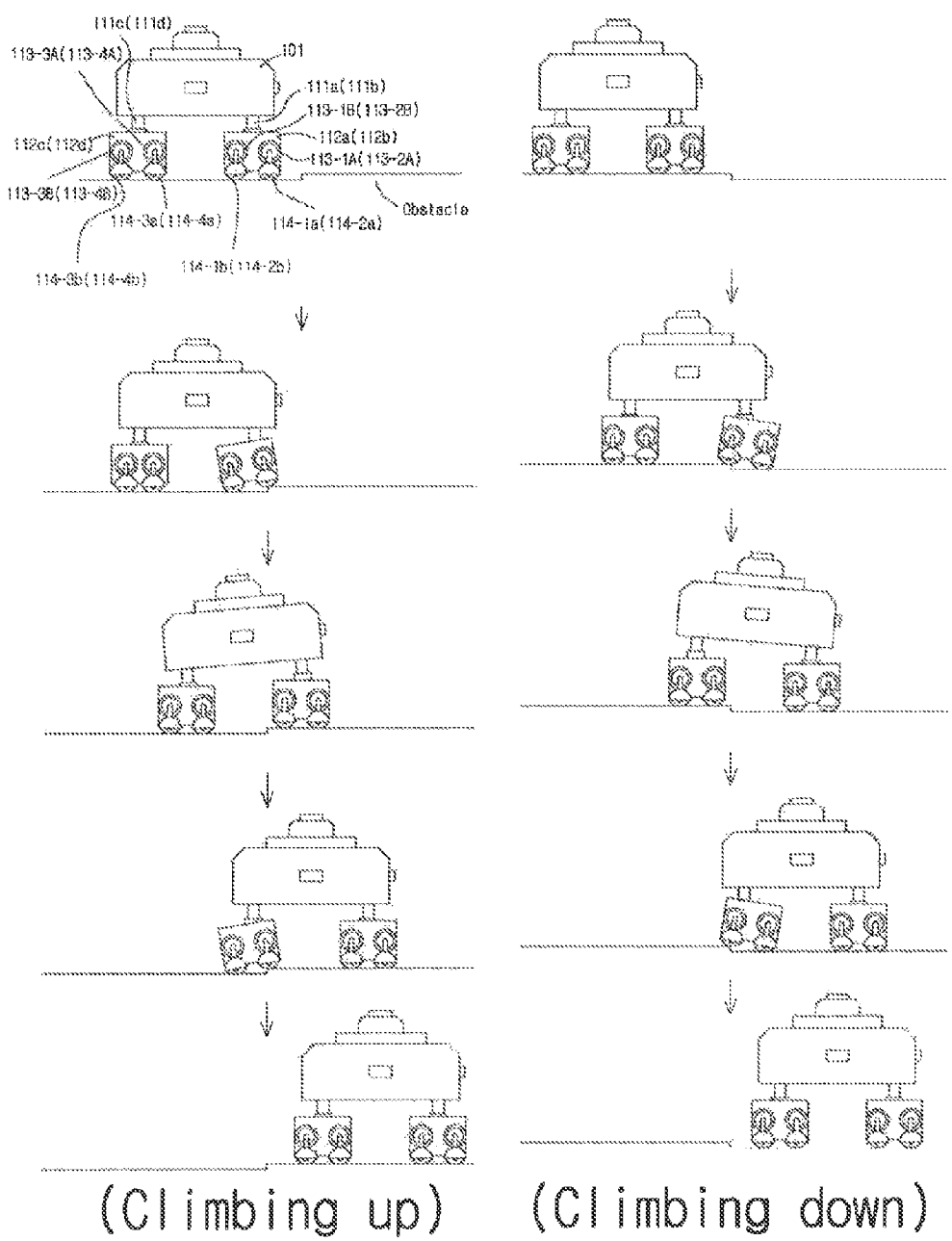
FIG. 8 is a side view showing that an ascending/descending portion climbs up/down an obstacle in the bridge inspection robot of FIG. 1.
Figure 9:
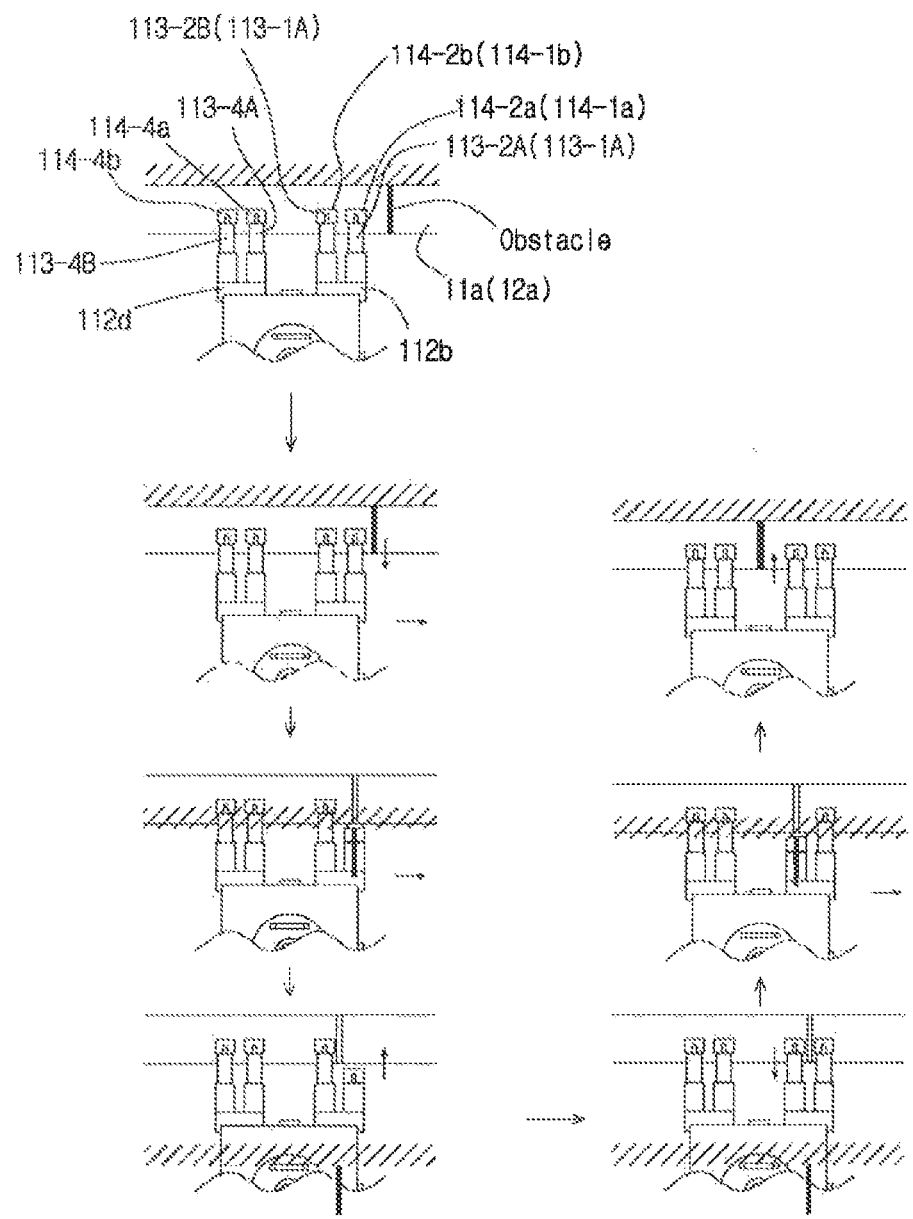
FIG. 9 is a plan view showing that an ascending/descending portion avoids an obstacle in the bridge inspection robot of FIG. 1.

FIG. 8 is a side view showing that an ascending/descending portion climbs up/down an obstacle in the bridge inspection robot of FIG. 1, and FIG. 9 is a plan view showing that an ascending/descending portion avoids an obstacle in the bridge inspection robot of FIG. 1.

As shown in FIGS. 8 and 9, the ascending/descending portion 110 includes: a plurality of up/down links 111 which are provided at the lower side of the robot main body 101 and performs up/down operations; rotational blocks 112 which are rotatably connected to the up/down links 111; a pair of extension and contraction booms 113 which are provided at both sides of the rotational blocks 112, respectively, and which are extended up to the flanges 11a and 12a of the first girder 11 and the second girder 12 between the first girder 11 and the second girder 12, so that the robot main body 101 are stably positioned between the first girder 11 and the second girder 12; and moving wheels 114 which are rotated by driving forces of driving shafts (not shown) which are provided at the pair of the extension and contraction booms 113, respectively, to thereby make the robot main body 101 move along the flanges 11a and 12a.

Here, the up/down links 111 make the rotational blocks 112 climb up/down, and make the moving wheels 114 move along the flanges 11a and 12a, and climb up/down an obstacle such as a joint member which connects a girder and another girder or a splice bolt connection portion. The up/down links 111 are divided into first and second up/down links 111a and 111b which are provided at the front side and third and fourth up/down links 111c and 111d which are provided at the rear side, according to the positions at which the up/down links are positioned.

The rotational blocks 112 make the extension and contraction booms 113 and the moving wheels 114 rotate in a seesaw style, when the rotational blocks 112 climb up/down an obstacle. The rotational blocks 112 are divided into first and second rotational blocks 112a and 112b which are provided in the first and second up/down links 111a and 111b, respectively, and third and fourth rotational blocks 112c and 112d which are provided in the third and fourth up/down links 111c and 111d, respectively, according to the positions at which the rotational blocks are positioned.

The extension and contraction booms 113 are extended or contracted foldably through a hydraulic/air pressure cylinder or a rack gear and a pinion gear, so as to correspond to a distance between the flanges 11a and 12a of the first and second girders 11 and 12, and make the moving wheels 114 avoid and climb over an obstacle such as a vertical stiffener which connects between girders or a splice vertical stiffener when the moving wheels 114 move along the flanges 11a and 12a. The extension and contraction booms 113 are divided into first A and B extension and contraction booms 113-1A and 113-1B which are provided in the first rotational blocks 112a, respectively, second A and B extension and contraction booms 113-2A and 113-2B which are provided in the second rotational blocks 112b, respectively, third A and B extension and contraction booms 113-3A and 113-3B which are provided in the third rotational blocks 112c, respectively, and fourth A and B extension and contraction booms 113-4A and 113-4B which are provided in the fourth rotational blocks 112d, respectively, according to the positions at which the extension and contraction booms are positioned.

The moving wheels 114 climb up/down an obstacle such as a joint member which connects between the girders, through the up/down movement of the up/down links 111 or the seesaw rotation of the rotational blocks 112, or avoid and climb over an obstacle such as a vertical stiffener which connects between the girders or a splice vertical stiffener, through extension and contraction of the extension and contraction booms 113. The moving wheels 114 are divided into first a and b moving wheels 114-1a and 114-1b which are provided in the first A and B extension and contraction booms 113-1A and 113-1B, respectively, second a and b moving wheels 114-2a and 114-2b which are provided in the second A and B extension and contraction booms 113-2A and 113-2B, respectively, third a and b moving wheels 114-3a and 114-3b which are provided in the third A and B extension and contraction booms 113-3A and 113-3B, respectively, and fourth a and b moving wheels 114-4a and 114-4b which are provided in the fourth A and B extension and contraction booms 113-4A and 113-4B, respectively.

Here, when the ascending/descending portion 110 avoids an obstacle, an operation of climbing up/down an obstacle such as a joint member which connects the girders or a splice bolt connection portion will be described below.

First of all, as shown in FIG. 8, when the ascending/descending portion 110 climbs up an obstacle, the first a and second a moving wheels 114-1a and 114-2a are lifted up to be a little higher than an obstacle by the first and second up/down links 111a and 111b or the first and second rotational blocks 112a and 112b, and then the moving wheels 114 are driven. Accordingly, the first a and second a moving wheels 114-1a and 114-2a move forward so as to be put up against edges of the obstacle. Then, the first b and second b moving wheels 114-1b and 114-2b are lifted up in a horizontal state at the upper portion of the obstacle by the first and second up/down links 111a and 111b or the first and second rotational blocks 112a and 112b, and then the moving wheels 114 are driven. Accordingly, the first a and first b moving wheels 114-1a and 114-1b and the second a and second b moving wheels 114-2a and 114-2b are stably positioned at the upper portion of the obstacle. Then, the third a and fourth a moving wheels 114-3a and 114-4a are lifted up to be a little higher than an obstacle by the third and fourth up/down links 111c and 111d or the third and fourth rotational blocks 112c and 112d, and then the moving wheels 114 are driven. Accordingly, the third a and fourth a moving wheels 114-3a and 114-4a move forward so as to be put up against edges of the obstacle. Then, the third b and fourth b moving wheels 114-3b and 114-4b are lifted up in a horizontal state at the upper portion of the obstacle by the third and fourth up/down links 111c and 111d or the third and fourth rotational blocks 112c and 112d, and then the moving wheels 114 are driven. Accordingly, the third a and third b moving wheels 114-3a and 114-3b and the fourth a and fourth b moving wheels 114-4a and 114-4b are stably positioned at the upper portion of the obstacle.

In addition, when the ascending/descending portion 110 climbs down an obstacle, the first a and second a moving wheels 114-1a and 114-2a are lifted down to be a little higher than the bottom of a bridge inspection path by the first and second up/down links 111a and 111b or the first and second rotational blocks 112a and 112b, and then the moving wheels 114 are driven. Accordingly, the first a and second a moving wheels 114-1a and 114-2a move forward so as to be put up against edges of the bridge inspection path. Then, the first b and second b moving wheels 114-1b and 114-2b are lifted down in a horizontal state on the bottom of the bridge inspection path by the first and second up/down links 111a and 111b or the first and second rotational blocks 112a and 112b, and then the moving wheels 114 are driven. Accordingly, the first a and first b moving wheels 114-1a and 114-1b and the second a and second b moving wheels 114-2a and 114-2b are stably positioned on the bottom of the bridge inspection path. Then, the third a and fourth a moving wheels 114-3a and 114-4a are lifted down to be a little higher than the bottom of the bridge inspection path by the third and fourth up/down links 111c and 111d or the third and fourth rotational blocks 112c and 112d, and then the moving wheels 114 are driven. Accordingly, the third a and fourth a moving wheels 114-3a and 114-4a move forward so as to be put up against the bottom of the bridge inspection path. Then, the third b and fourth b moving wheels 114-3b and 114-4b are lifted down in a horizontal state on the bottom of the bridge inspection path by the third and fourth up/down links 111c and 111d or the third and fourth rotational blocks 112c and 112d, and then the moving wheels 114 are driven. Accordingly, the third a and third b moving wheels 114-3a and 114-3b and the fourth a and fourth b moving wheels 114-4a and 114-4b are stably positioned on the bottom of the bridge inspection path.

Here, when the moving wheels 114 climb over an obstacle, the lift-up and lift-down operations of the moving wheels 114 are controlled by the up/down links 111 and the rotational blocks 112. In this case, height of the obstacle can be limited to the case that is higher than height of the moving wheels 114. Otherwise, the up/down links 111 are formed into a fixed shaft and the rotational blocks 112 are formed into a free rotational shaft which simply exercises a seesaw operation. Accordingly, it is preferable that ascending/descending spikes (not shown) which are further respectively provided in the moving wheels 114, climb over the obstacle by the driving force of the moving wheels 114.

Meanwhile, when the ascending/descending portion 110 avoids an obstacle, an operation of avoiding the obstacle such as a stiffener or a splice vertical stiffener which connects between the girders will be described below.

As shown in FIG. 9, when an obstacle is detected during movement of a bridge inspection path, the first a and second a wheels 114-1a and 114-2a which are provided in the first A and second A extension and contraction booms 113-1A and 113-2A are positioned at the outer side of the obstacle which is positioned at the side wall of the bridge inspection path or the flanges 11a and 12a, by contraction of the first A and second A extension and contraction booms 113-1A and 113-2A, and then the moving wheels 114 are driven. Accordingly, the first a and second a moving wheels 114-1a and 114-2a pass away position of the obstacle. Then, the first a and second a wheels 114-1a and 114-2a are positioned at the upper portion of the bridge inspection path or the flanges 11a and 12a, by extension of the first A and second A extension and contraction booms 113-1A and 113-2A. Thereafter or simultaneously, the first b and second b wheels 114-1b and 114-2b which are provided in the first B and second B extension and contraction booms 113-1B and 113-2B are positioned at the outer side of the obstacle which is positioned at the side wall of the bridge inspection path or the flanges 11a and 12a, by contraction of the first A and second A extension and contraction booms 113-1A and 113-2A, and then the moving wheels 114 are driven. Accordingly, the first b and second b moving wheels 114-1b and 114-2b pass away position of the obstacle. Then, the first b and second b wheels 114-1b and 114-2b are positioned at the upper portion of the bridge inspection path or the flanges 11a and 12a, by extension of the first B and second B extension and contraction booms 113-1B and 113-2B.

Here, the first A and second A extension and contraction booms 113-1A and 113-2A and the first B and second B extension and contraction booms 113-1B and 113-2B have been described to be extended or contracted simultaneously according to an obstacle. However, it is preferable that the first A and second A extension and contraction booms 113-1A and 113-2A and the first B and second B extension and contraction booms 113-1B and 113-2B are independently extended or contracted according to whether or not the obstacle is detected.

In addition, it is preferable that obstacle ascending/descending operations of the third a and third b wheels 114-3a and 114-3b and the fourth a and fourth b wheels 114-4a and 114-4b according to extension and contraction of the third A and B extension and contraction booms 113-3A and 113-3B and the third A and B extension and contraction booms 113-4A and 113-4B are performed in the same operation as the above-described operation.

Thus, the ascending/descending portion 110 climbs up/down an obstacle such as a joint member which connects between the girders or a splice bolt connection portion, through the up/down movement or seesaw rotation of the up/down links 111 and the rotational blocks 112, respectively.

In addition, a vertical stiffener which connects between the girders or a splice vertical stiffener can be avoided and climbed over without having position changes of a robot main body 101, through extension and contraction of the extension and contraction booms 113. As a result, the lower portion of a bridge can be successively photographed, to thereby enhance an efficiency of bridge inspection.

The obstacle detection portion 120 is provided at the front one side or the lower surface of the robot main body 101 and one side of the extension and contraction booms 113. The obstacle detection portion 120 reflects an ultrasonic wave on an obstacle which exists on the bridge inspection path, using an ultrasonic sensor 121, and measures the ultrasonic wave reflected from the obstacle, to thereby detect whether or not an obstacle exists. As a result, when an obstacle is detected, the moving wheels 114 of the ascending/descending portion 110 are controlled.

In addition, the obstacle detection portion 120 further includes a contact switch (not shown) which is provided at one side of the extension and contraction booms 113 of the ascending/descending portion 110 and contacts the wall surface of the girder in the case that the girder is bent, to thus detect curve of the girder, or an ultrasonic sensor (not shown) which reflects an ultrasonic wave on the wall surface of the girder and measures the ultrasonic wave reflected from the wall surface of the girder to thus detect curve of the girder, in order to detect whether or not the girder is bent in a curved form when the moving wheels 114 move between the girders. It is preferable that the moving wheels 114 are controlled in correspondence to detection of the curve of the girder by the contact switch (not shown) and the ultrasonic sensor (not shown).

The image photographing portion 130 includes a CCD (charge coupled device) camera 131 and an illumination unit (not shown) which are provided at the upper side of the robot main body 101 and successively photographs the bridge lower surface on the bridge inspection path into blocks of a predetermined size, and an elastic member (not shown) such as a spring which prevents an irregular environmental element at a place where the CCD camera 131 is installed, that is, vibration of the bridge by bridge passing vehicles or wind, and self-vibration of the CCD camera 131.

Figure 10:
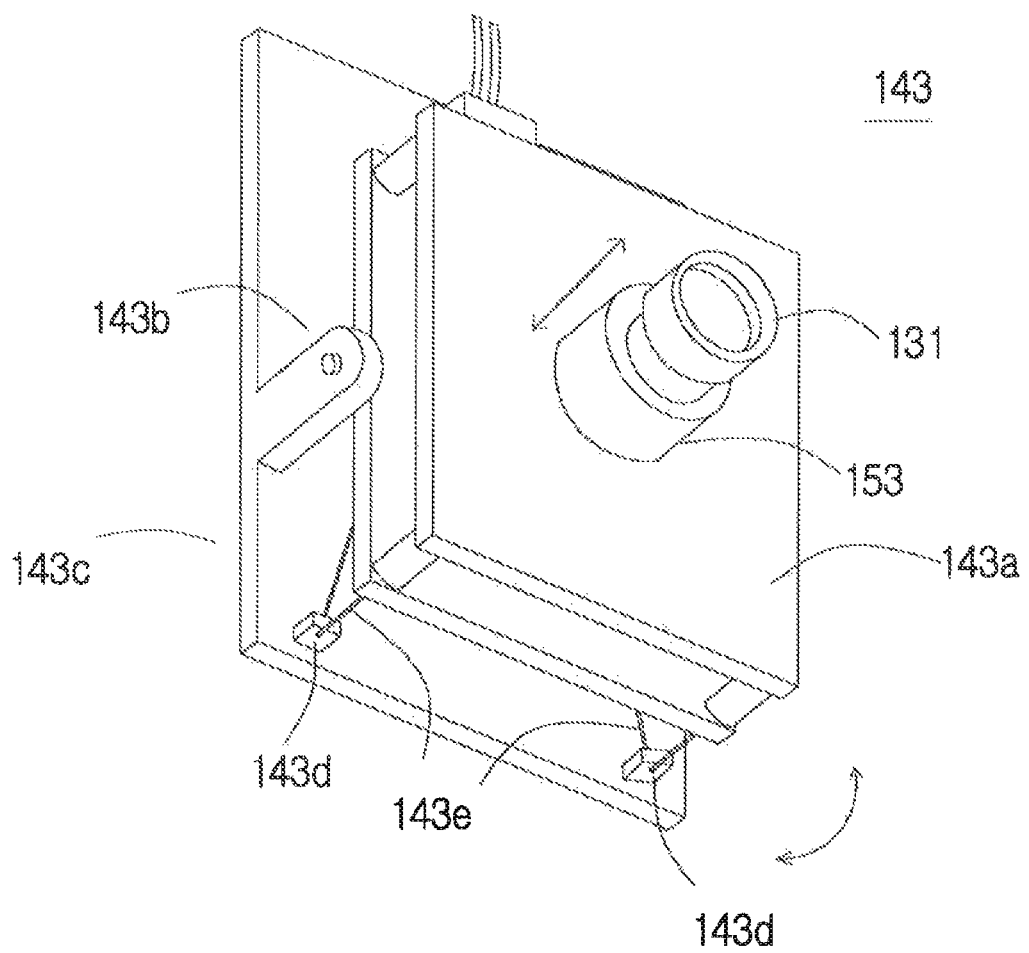
FIG. 10 is a perspective view showing a slope adjustment portion in the bridge inspection robot of FIG. 1.

FIG. 10 is a perspective view showing a slope adjustment portion in the bridge inspection robot of FIG. 1.

As shown in FIG. 10, the slope adjustment portion 140 includes a slope detection sensor (not shown) which detects a slope of the robot main body 101 when the ascending/descending portion 110 climbs up/down an obstacle, and a camera angle adjustment portion 143 which adjusts a photographing angle of the CCD camera 131 so as to correspond to the slope detected by the slope detection sensor (not shown) and which makes the CCD camera 131 photograph while maintaining a predetermined angle with respect to the bridge lower surface on the bridge inspection path, for example, the state where the bridge lower surface is perpendicular with the CCD camera 131.

Here, it is preferable that the slope detection sensor (not shown) is provided in the inside of the robot main body 101 and includes a plurality of electrode rods covered with a glass tube which is filled with an electrolyte therein. Accordingly, when the slope detection sensor (not shown) is slanted, the electrolyte in the inside of the glass tube is slanted and the slope is measured through a changed resistance value of the electrode rods according to a change rate of the electrolyte which is filled between the electrode rods.

In addition, the camera angle adjustment portion 143 includes a rotational frame 143a which supports the CCD camera 131, a bass plate 143c which enables the rotational frame 143a to be rotatably combined through a hinge portion 143b, and a biometal wire 143e which is guided by a guide portion 143d and contracted and extended by an electric signal to thus make the rotational frame 143a rotate. Here, a load member such as a counterweight is further provided at one end of the rotational frame 143a. When the biometal wire 143e is extended, it is preferable that the rotational frame 143a is rotated in a direction that the load member is provided.

Therefore, according to the camera angle adjustment portion 143, the rotational frame 143a is rotated through the electric signal provided for the biometal wire 143e according to the slope detected by the slope detection sensor 143. Accordingly, the CCD camera 131 maintains a photographing angle perpendicular with the bridge lower surface all the time irrespective of the slope according to the obstacle ascending/descending operation of the robot main body 101, and successively photographs the bridge lower surface on the bridge inspection path into blocks of a predetermined size.

The photographing altitude control portion 150 includes an altitude detection sensor 151 which detects whether or not a photographing height of the image photographing portion 130 is changed when the ascending/descending portion 110 climbs up/down an obstacle which exists on the bridge inspection path and calculates a z-axis position coordinate of the image photographing portion 130, and a camera height adjustment portion 153 which adjusts the photographing height of the CCD camera 131 so as to correspond to the z-axis position coordinate of the image photographing portion 130 detected by the altitude detection sensor 151, and makes the CCD camera 131 photograph while having a z-axis position coordinate of a constant height with respect to the bridge lower surface on the bridge inspection path.

Here, the altitude detection sensor 151 is provided at the upper and lower sides or the left and right sides of the robot main body 101, respectively. The altitude detection sensor 151 reflects an ultrasonic wave onto the bottom surface of the bridge inspection path or the lower surface of the bridge and measures the ultrasonic wave reflected from the bottom surface of the bridge inspection path or the lower surface of the bridge, to thereby calculate a photographing height change of the CCD camera 131, that is, a z-axis position coordinate of the image photographing portion 130, according to avoiding of an obstacle.

In addition, the camera height adjustment portion is a lift unit such as a hydraulic/air pressure cylinder which is provided between the CCD camera 131 and the rotational frame 143a which supports the CCD camera 131, and which escalates a body tube of the CCD camera 131 so as to correspond to the photographing height of the CCD camera 131 which has been calculated by the altitude detection sensor 151.

Therefore, the camera height adjustment portion 153 escalates and adjusts the body tube of the CCD camera 131 according to the photographing height change of the CCD cameras 131 which has been detected by the altitude detection sensor 151. Accordingly, the CCD camera 131 maintains a constant photographing height or a z-axis position coordinate of the image photographing portion 130, irrespective of a photographing height change according to avoiding of an obstacle of the robot main body 101, and successively photographs the bridge lower surface on the bridge inspection path into blocks of a predetermined size.

The position calculation portion 160 includes an x-axis position coordinate encoder (not shown) which detects the number of rotations of the moving wheels 114 of the ascending/descending portion 110 and calculates a moving distance (x-axis) of the robot main body 101, a y-axis position coordinate sensor (not shown) which calculates a distance (y axis) between the first A and first B extension and contraction booms 113-1A and 113-1B and the second A and second B extension and contraction booms 113-2A and 113-2B, or between the third A and third B extension and contraction booms 113-3A and 113-3B and the fourth A and fourth B extension and contraction booms 113-4A and 113-4B, respectively, and a coordinate calculator (not shown) which calculates x/y axis position coordinates of the image photographing portion 130 corresponding to a motion of the ascending/descending portion 110 through the x-axis position coordinate and y-axis position coordinate of the image photographing portion 130.

It is desirable that the position calculation portion 160 further includes a GPS receiver and receives an absolute position coordinate with respect the initial position from an artificial satellite.

Figure 11:
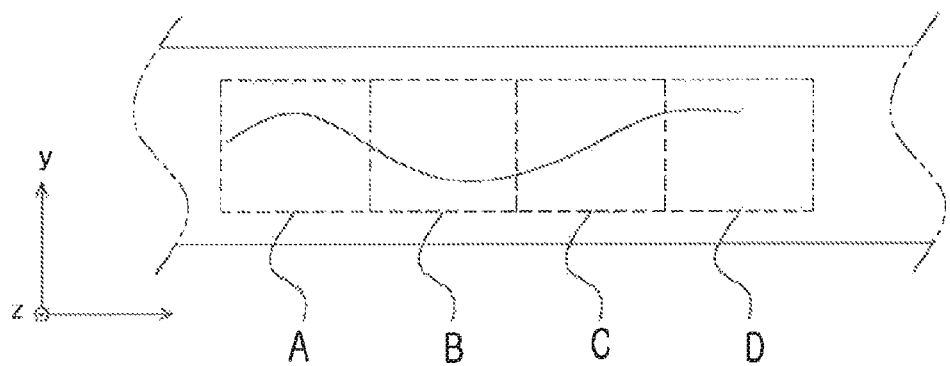
FIG. 11 shows that a crack portion of a bridge which is consecutively photographed by an image photographing portion in the bridge inspection robot of FIG. 1 is illustrated into blocks of a predetermined size.
Figure 12:
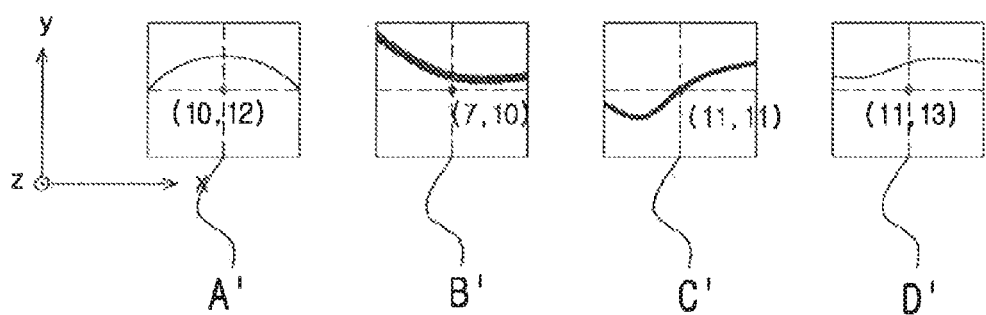
FIG. 12 shows images of a bridge whose photographing blocks regarding crack portions of the bridge of FIG. 11 are consecutively photographed.

FIG. 11 shows that a crack portion of a bridge which is consecutively photographed by an image photographing portion in the bridge inspection robot of FIG. 1 is illustrated into blocks of a predetermined size. FIG. 12 shows images of a bridge whose photographing blocks regarding crack portions of the bridge of FIG. 11 are consecutively photographed, and FIG. 13 shows the images which are consecutively arranged based on position information regarding the consecutively photographed images of FIG. 11.

The image processing portion 170 automatically recognizes crack elements of the photographed images through a image processing program and stores and manages the automatically recognized crack elements in a database. In addition, the x/y-axis position coordinate of the image photographing portion 130 calculated by the position calculation portion corresponding to the photographed images and the z-axis position coordinate of the image photographing portion 130 calculated by the photographing altitude control portion 150 are calculated into the global coordinate from the local coordinate or position coordinate, through a position information program. Accordingly, the last position information with respect to the image crack element is calculated and the image crack element is successively identified.

Here, the position information program includes a position information algorithm which assumes the image as a plane in order to obtain correct position information regarding the photographed images, and calculates the global coordinate with respect to the four corners of the image through the x/y/z-axis position coordinates, to thereby calculate the last position information with respect to the actual crack element included in the image through the image position information, and an image arrangement algorithm which makes the respective images arranged to have identical y-axis and z-axis coordinates with respect to the x-axis which is an advancing direction of the robot main body 101 based on the last position information, and which successively confirms the actual crack elements of the respective images.

Figure 13:
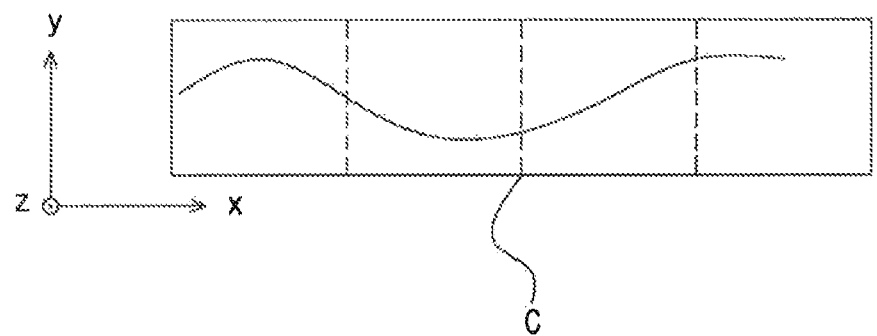
FIG. 13 shows the images which are consecutively arranged based on position information regarding the consecutively photographed images of FIG. 11.

As shown in FIGS. 11 to 13, the image arrangement algorithm arranges the photographed images A', B', C' and D' up and down and left and right and produces a continuous arrangement image C where the actual crack elements of the continuous images A', B', C' and D' are successively arranged, so that the y-axis and z-axis position information of the images A', B', C' and D' all are for example (10, 12), in the case that the y-axis and z-axis position information of the image A' is (10, 12), the y-axis and z-axis position information of the image B' is (7, 10), the y-axis and z-axis position information of the image C' is (11, 11), and the y-axis and z-axis position information of the image D' is (11, 13), with respect to the respectively different y-axis and z-axis position information of the images A', B', C' and D' which are obtained by successively photographing a plurality of blocks A, B, C and D of a bridge lower surface to be photographed by the CCD camera 131 which occurs when the CCD camera 131 sways due to curve of the bridge inspection path and the vibration of the bridge, with respect to the x-axis which an advancing direction of the robot main body 101.

In addition, the image processing program includes an image capturing algorithm which removes noise of the photographed image through a low pass filter, finds out a contour line of the image, compares the thickness and length values of the contour line and neighboring brightness values to thus find out a crack element, extracts only the clearest image, and stores the clearest image in a database together with the last position information, an image analysis algorithm which enhances the image and removes noise to then find out the contour line and to thus remove components which are not crack elements, through a process of filtering the earlier obtained image and widening a brightness area, in order to confirm a crack element based on the photographed image and the position information, and an image correction algorithm which makes a user correct, add and delete a reporting result directly in order to correct the finite crack element of the image.

Therefore, a bridge inspection robot which climbs up/down an obstacle which exists in a bridge inspection path, and which adjusts a photographing angle of a camera according to the present invention maintains the photographing angle to be perpendicular between the camera and the lower surface of the bridge all the time through a slope detection sensor and a camera angle adjustment portion, although a slope of the robot is changed.

In addition, the bridge inspection robot according to the present invention maintains an identical photographing height all the time through an altitude detection sensor and a camera height adjustment portion when the robot climbs up/down an obstacle, although a photographing height of the camera is changed with respect to the lower surface of the bridge when the robot avoids the obstacle.

In addition, the bridge inspection robot avoids an obstacle such as a vertical stiffener which is provided vertical with the upper side of the flanges, respectively, when the robot moves along a bridge inspection path, for example, the flanges, without having caused position changes of the robot, to thereby enable the camera to continuously photograph the lower surface of the bridge.

MODE FOR INVENTION

As described above, the present invention has been described with respect to particularly preferred embodiment. However, the present invention is not limited to the above embodiment, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, a bridge inspection robot according to the present invention may be applied to continuously photograph the lower surface of the bridge.

The invention claimed is:

1. A bridge inspection robot which is capable of avoiding an obstacle, the bridge inspection robot comprising:
   an ascending/descending portion which is extended to correspond to a gap distance between a flange of a first girder and a flange of a second girder which are provided at the upper side of a pier (L) of a bridge in which a robot main body (101) climbs up/down or avoids an obstacle, when the robot main body moves on the flanges, for example, along a bridge inspection path;
   an obstacle detection portion which detects the obstacle which exists on the flanges;
   a photographing altitude control portion which detects an altitude change of an image photographing portion according to height of the obstacle when the robot main body climbs up/down or avoids the obstacle, and adjusts a photographing height of the image photographing portion so as to correspond to the altitude change, to thus make the image photographing portion have a z-axis coordinate of an identical height all the time;
   a position calculation portion which measures mobile positions of the robot main body which corresponds to consecutive images photographed by the image photographing portion, to thus calculate x/y-axis coordinates of the image photographing portion;
   an image processing portion which receives the consecutively photographed images and x/y/z-axis coordinates corresponding to the consecutively photographed images, to thus continuously confirm actual crack elements corresponding to the consecutively photographed images and to thus produce recognizable consecutively photographed images of actual position coordinates of the corresponding consecutively photographed images; and a slope adjustment portion which detects a slope of the robot main body when the robot main body climbs up/down an obstacle, and adjusts the slope of the image photographing portion to correspond to the detected slope.

2. The bridge inspection robot according to claim 1, wherein the slope adjustment portion comprises:

a slope detection sensor which detects a slope of the robot main body when the ascending/descending portion climbs up/down an obstacle; and a camera angle adjustment portion which adjusts a photographing angle of a couple charged device (CCD) camera of the image photographing portion to correspond to the slope detected by the slope detection sensor and which makes the CCD camera photograph while maintaining the state where the bridge lower surface is perpendicular with the CCD camera.

3. The bridge inspection robot according to claim 2, wherein the slope detection sensor is provided in the inside of the robot main body and comprises:

a plurality of electrode rods covered with a glass tube which is filled with an electrolyte therein, in which the electrolyte in the inside of the glass tube is slanted and the slope is measured through a changed resistance value of the electrode rods according to a change rate of the electrolyte which is filled between the electrode rods, when the slope detection sensor is slanted.

4. The bridge inspection robot according to claim 2, wherein the camera angle adjustment portion comprises:

a rotational frame which supports the CCD camera, a base plate which enables the rotational frame to be rotatably combined through a hinge portion; and a biometal wire which is guided by a guide portion and contracted and extended by an electric signal to thus make the rotational frame rotate.

5. The bridge inspection robot according to claim 1, wherein the photographing altitude control portion comprises:

an altitude detection sensor which detects whether a photographing height of the image photographing portion is changed when the ascending/descending portion climbs up/down an obstacle which exists on the bridge inspection path and calculates a z-axis position coordinate of the image photographing portion; and a camera height adjustment portion which adjusts the photographing height of the CCD camera so as to correspond to the z-axis position coordinate of the image photographing portion detected by the altitude detection sensor, and makes the CCD camera photograph while having a z-axis position coordinate of a constant height with respect to the bridge lower surface on the bridge inspection path.

* * * * *